Nov. 18, 1969

R. E. McKINNEY 3,478,968

BULK MATERIAL HANDLING SYSTEM

Filed Nov. 8, 1967

INVENTOR
RALPH E. McKINNEY

BY
*Olsen and Stephenson*
ATTORNEYS

INVENTOR
RALPH E. McKINNEY

Nov. 18, 1969   R. E. McKINNEY   3,478,968
BULK MATERIAL HANDLING SYSTEM

Filed Nov. 8, 1967   3 Sheets-Sheet 3

INVENTOR
RALPH E. McKINNEY

BY
*Olsen and Stephenson*
ATTORNEYS

# United States Patent Office 3,478,968
Patented Nov. 18, 1969

3,478,968
BULK MATERIAL HANDLING SYSTEM
Ralph E. McKinney, Beatrice, Nebr., assignor to Hoover Ball and Bearing Company, Saline, Mich., a corporation of Michigan
Filed Nov. 8, 1967, Ser. No. 681,532
Int. Cl. B66f 9/00
U.S. Cl. 239—650        5 Claims

ABSTRACT OF THE DISCLOSURE

A system for moving bulk material, such as fertilizer, from a storage area to a distributed position on a field wherein the material is first placed in large ground supported bin assemblies which function as bulk storage units for the material, shipping containers for the material, and discharge hoppers for the material during distribution. A vehicle, such as a truck, provided with bin engageable lift units transports the bin assemblies from the storage area to the field on which fertilizer is to be distributed. At the field, the bin assemblies are returned to ground supported positions and then to positions supported on a fertilizer distributor vehicle which is moved across the field to be fertilized. When the bin assembly is supported on the fertilizer distributor vehicle, the bin functions as a fertilizer container and discharge hopper from which the fertilizer is distributed to the field.

Cross reference to related applications

The system of this invention employs a bin assembly which is the subject matter of copending application Ser. No. 681,531, filed Nov. 8, 1967, and fertilizer distributor vehicle disclosed in copending application Ser. No. 688,463, filed Dec. 6, 1967. Both applications are assigned to the assignee of this application.

Background of the invention

The present system for moving fertilizer to a distributed position on a farm field requires a variety of mechanical equipment, such as loaders, trucks with large capacity bodies, wagon-type applicators, etc., which is expensive and which must sit idle over prolonged periods. Geographically centralized farm centers obtain the basic ingredients for fertilizer in covered hopper rail cars and store these ingredients in large storage areas. Soil samples are taken from each field to be fertilized, and based on an analysis of these samples, the required basic fertilizer ingredients are taken, by means of a loader from the storage areas and then blended in the desired proportions for eventual distribution on the field. When the field is to be fertilized, this blend is loaded into a trailer spreader which is towed to the field. In the event the field is a size to require more fertilizer than the capacity of the spreader, which is the usual case, the spreader must either be returned to the farm center several times for filling, or a large volume of the fertilizer must be trucked to the field and stored in the truck for periodic transfer to the spreader during the entire fertilizing operation. This system is thus very inefficient from the standpoint of labor time, requires expensive equipment which either sits idle or is being moved back and forth between the farm center and the field, and requires an unnecessarily prolonged period of time to complete the fertilizing of a field. It is an object of this invention, therefore, to provide improved method and apparatus for accomplishing the ultimate purpose of movement of fertilizer from a storage area onto the field.

Summary of the invention

This invention provides a system consisting of three separate pieces of equipment, namely, a large capacity bin assembly, a transport vehicle capable of moving the bin assembly filled with fertilizer from the storage area to the field to be fertilized, and a fertilizer distributor vehicle capable of having the bin assembly supported thereon during travel of the vehicle across the field to empty and spread the bin assembly contents onto the field. The bin assembly includes a large container for fertilizer and is constructed so that the vehicles used in the system can be driven to positions in which they extend underneath the container thereby facilitating loading and unloading of the container. Ground support legs on the bin assembly support the container during vehicle loading and unloading and enable the bin to be ground supported for storing the container contents for any desired time period. The bin assembly is also constructed so that when it is mounted on the fertilizer distributor, it functions as the fertilizer containing discharge hopper from which fertilizer flows to the usual spinner disks which spread the fertilizer evenly across the field to be fertilized.

Further objects, features and advantages of this invention will become apparent from a consideration of the following description, the appeneded claims, and the accompanying drawing in which:

FIGURE 1 is a side elevational view illustrating a portion of the system of this invention, namely, a transport vehicle and two bin assemblies, one of which is shown in a supported position for transport on the vehicle, and the other one of which is shown in a ground supported position just prior to being moved to a supported position on the vehicle, and illustrating diagrammatically a storage device from which the bin assemblies are filled;

Figure 1:
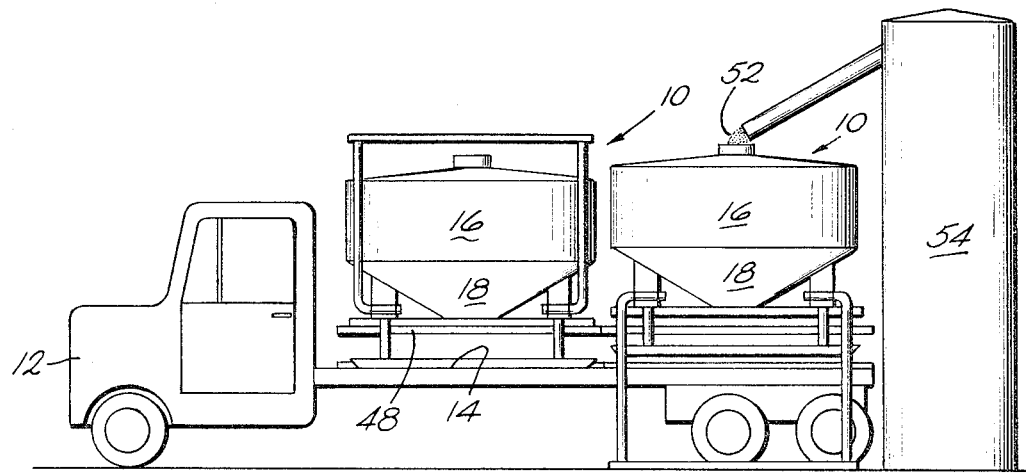
Figure 2:
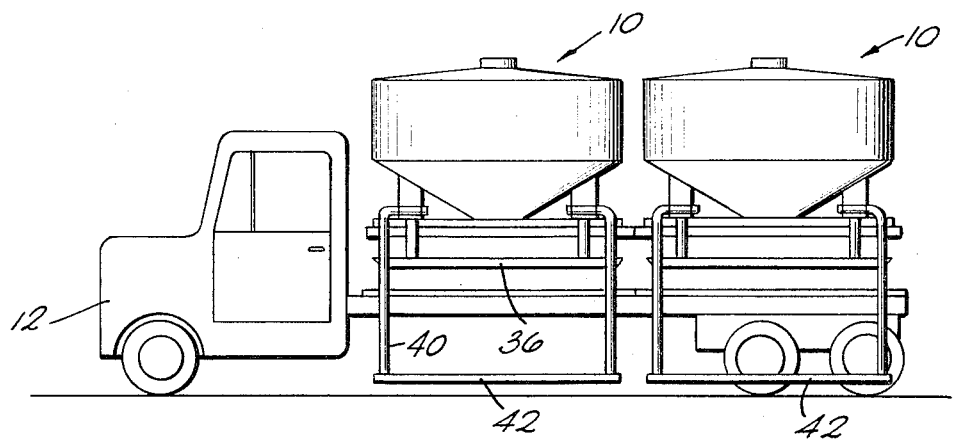
FIGURE 2 is a side elevational view like FIG. 1 illustrating the bin assemblies in positions about to be ground supported at the field to which the bin assemblies have been transported.
Figure 4:
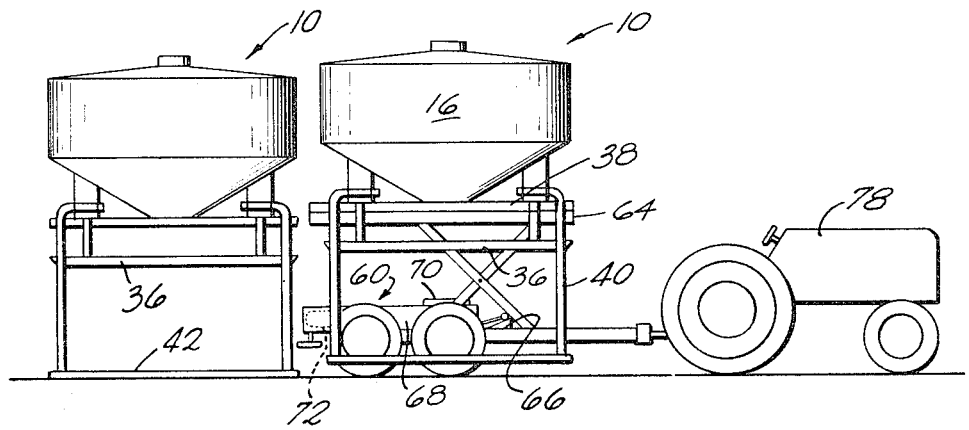
Figure 5:
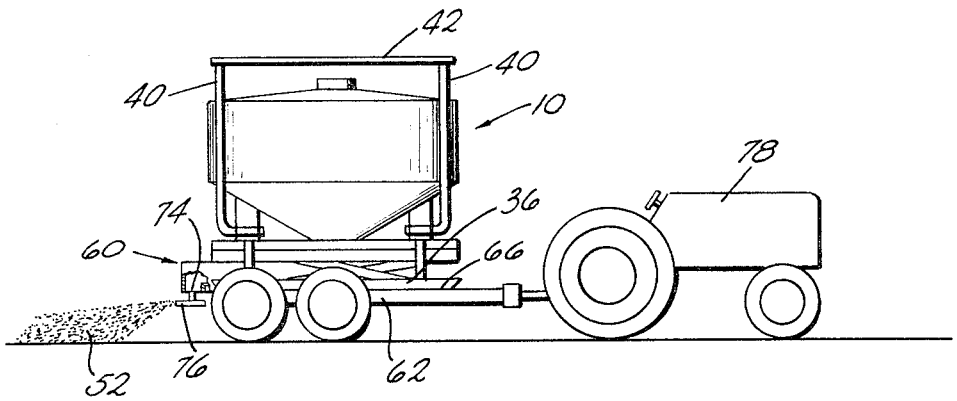

FIGURE 4 is a side elevatioinal view, like FIGS. 1 and 2, showing a pair of bin assemblies, one of which is ground supported and the other one of which is in the initial stages of being moved to an operative supported position on a fertilizer distributor vehicle; and FIGURE 5 is a side elevational view showing one of the bins of FIG. 4 in an operative supported position on the fertilizer distributor vehicle illustrated therein.

With reference to the drawing, the system of this invention is illustrated in FIG. 1 as including bin assemblies 10, which are particularly described in the forementioned copending application, and a transport vehicle 12, such as a truck, having a loading carrying bed 14. Each bin assembly 10 includes an upright hollow container 16 having a bottom hopper portion 18 which is of generally conical or funnel shape and terminates in a downwardly facing discharge opening 20 (FIG. 3) adapted to be closed by a slide gate 22. The container 16 is mounted on a support frame 24 and has a top wall 26 provided with a fill opening 28. A weather-tight cover 30 is provided for the opening 28 and is relatively held in a closed position by a cover lock unit 32. Four support members 34 extend downwardly from the frame 24 on opposite sides of the discharge opening 20, and the support members 34 on each side of the discharge opening 20 are connected by skids 36. Lift force transmitting plates 38 are mounted on the frame 24 at positions above the skids 36 so that the plates 38 are substantially parallel to the skids 36. Four ground support legs 40, which are considerably longer than the supports 34, are pivotally attached to the frame 24 so that they are movable between the downwardly extending operative positions shown in full lines in FIG. 3 and the upwardly extending inoperative positions shown in broken lines in FIG. 3. The pair of legs 40 on each side of the discharge opening 20 are connected by stabilizing members 42 which are also substantially parallel to the skids 36.

Figure 3:
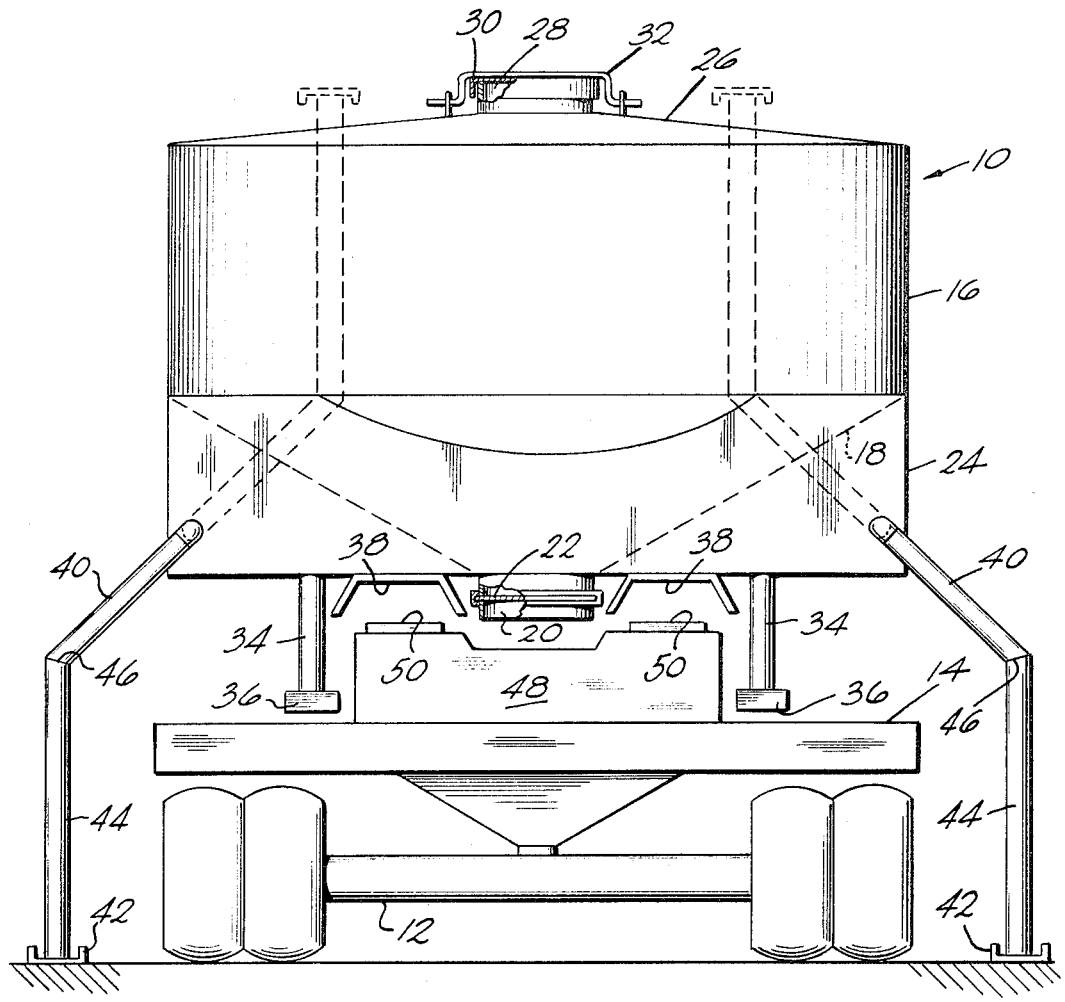
FIGURE 3 is a rear elevational view of a bin assembly showing the assembly in a ground supported position and illustrating the position of the bin assembly relative to a transport vehicle onto which the bin assembly is to be loaded or from which the bin assembly has been unloaded.

As shown in FIG. 3, each leg 40 includes an upright portion 44 which is of a length such that the upper end 46 thereof is located above the height of the transport vehicle load supporting bed 14. Also, the leg portions 44 on opposite sides of the discharge opening 20 are spaced apart a distance greater than the width of the bed 14 so that the bed 14 can be moved horizontally to a position between the connected pairs of legs 40. As also shown in FIG. 3, the supports or shorter legs 34 are of a length such that the skids 36 are located at a height above the height of the bed 14 when the legs 40 are ground supported. This enables movement of the vehicle 12 so as to position the bed 14 relative to a ground supported bin assembly 10 as illustrated in FIGS. 1 and 3.

The vehicle 12 is equipped with a number of lift units 48, corresponding to the number of bin assemblies 10 which the vehicle 12 is capable of carrying, namely, two in the illustrated embodiment of the invention. As shown in FIG. 3, each lift unit 48 includes a pair of lift members 50 movable up and down and located in vertical alignment with the force transmitting plates 38 on a bin assembly 10 when the bed 14 is located relative to the bin assembly 10 as shown in FIG. 3. Thus, when the vehicle bed 14 is positioned relative to a ground supported bin assembly 10, as shown in FIGS. 1 and 3, the lift members 50 can be moved upwardly into engagement with the lift plates 38 so as to move the bin assembly 10 upwardly to a position in which the ground support leg stabilizing members 42 are disposed above the ground surface as shown for the bins 10 illustrated in FIG. 2.

As a result, the container 16 for a bin assembly 10 can be filled with fertilizer 52 (FIG. 1) directed through the filling opening 28 from a storage area or device indicated somewhat diagrammatically at 54 in FIG. 1. The fertilizer 52 can then be stored in the container 16 for whatever time period is desired or necessary. The transport vehicle 12 can be then moved so that the bed 14 is positioned below the skids 36 and the lift unit 48 operated to lift the bin assembly 10 so as to clear the legs 40 from the ground surface. The legs 40 are then movable to the inoperative positions shown for one on the bin assemblies 10 in FIG. 1, and the lift unit 48 operated to retract the lift members 50 so as to lower the skids 36 into supported positions on the bed 14. As shown in FIG. 1, in the illustrated embodiment of the invention two such bin assemblies 10 can thus be firmly supported for transport purposes on the vehicle 12.

The vehicle 12 is then driven to the field to be fertilized, following which the lift units 48 are operated to raise the bin assemblies 10 sufficiently to enable the legs 40 to be moved to the operative positions shown in FIG. 2 in which the leg stabilizing members 42 are above the ground surface. The lift units 48 are then retracted so as to move the bin assemblies 10 to ground supported positions on the legs 40. The vehicle 12 can then be driven forwardly so as to move the bed 14 out from under the bin assemblies 10, and the vehicle 42 can then be used for some other useful purpose, with the bin assembly 10 then functioning as storage unit for the fertilizer therein at the field where the fertilizer is to be used.

When it is desired to distribute the fertilizer 52 in one or more of the bin assemblies 10 on the field, a fertilizer distributor vehicle 60 (FIGS. 4 and 5), which is described in detail in the aforementioned copending application, is employed. The vehicle 60 includes a wheel chassis 62 on which a lift unit 64, which functions like the lift unit 48 previously described is mounted. The vehicle 60 also includes a load supporting surface 66 of substantially the same width as the truck bed 14 and disposed at a height which does not substantially exceed the height of the truck bed 14. In the illustrated embodiment of the invention, the load supporting surface 66 is at a height below the height of the bed 14. The vehicle 60 also includes a hollow body 68 having an inlet opening 70 and enclosing a conveyor 72 which is operable to move fertilizer entering the body 68 at the inlet 70 to an outlet 74 from which the fertilizer 52 is discharged onto conventional spinner disks 76 which operate to distribute the fertilizer 52 in a uniform pattern on the field being fertilized. The vehicle 60 is illustrated as being drawn by and connected to a tractor 78, but it is to be understood that the vehicle 60 can be self-propelled.

With the bin assemblies 10 ground supported at the field to be fertilized, the vehicle 60 is backed into a position below the container 16 for one of the bin assemblies 10 as shown in FIG. 4. The lift unit 64 is moved upwardly to engage the force transmitting plates 38 and move the bin assembly 10 upwardly to a position in which the leg stabilizing plates 42 are in a clearance relation with the ground. The leg members 40 are then pivoted upwardly to their inoperative positions and the lift unit 64 is operated to lower the bin assembly 10 to a position in which the skids 36 are firmly supported on the load supporting surface 66, as shown in FIG. 5.

The inlet 70 for the distributor 60 is positioned in substantially vertical alignment with the container discharge opening 20 so that when the bin assembly 10 is lowered to a supported position on the surface 62, the bin discharge opening 20 is in registry with the distributor inlet opening 70. The slide gate 22 is opened so that the fertilizer 52 in the bin assembly 10 flows into the body 68. The tractor 78 is driven so as to draw the vehicle 60 across the field to be fertilized with the conveyor 72 operating to deliver fertilizer from the body inlet 70 to the spinner disks 76. During such movement of the vehicle 60, the bin assembly 10 functions as a fertilizer carrying hopper for the vehicle 60. Fertilizer from the bin assembly 10 continually flows into the inlet 70 until the contents of the bin assembly 10 have been exhausted.

The empty bin assembly 10 is then returned to a position where it can be conveniently picked up by the vehicle 12, the left unit 64 is operated to raise the bin assembly 10 to the position shown in FIG. 4, the ground support legs 40 are swung downwardly and the lift unit 64 is retracted so that the bin assembly 10 is again supported on its legs 40. The above-described cycle of operation for the distributor vehicle 60 is then repeated for the next bin assembly 10.

From the above description it is seen that this invention provides a method and apparatus for moving bulk fertilizer from a storage area 54 to a distributed position on a field, with the bin assemblies functioning at all times as the sole container for the fertilizer. The number of bin assemblies 10 which can be used is limited only by the most economical size of transport vehicle 12 usable in each instance. In all instances, the construction of the bin assemblies 10 for coaction with the vehicles 12 and 60 enables ready loading and unloading of the bin assemblies 10 with a minimum of difficulty and handling. Furthermore, the cooperation of the bin assembly 10 and the distributor vehicle 60 enables the use of a very simple and inexpensive distributor vehicle 60 since the bin assembly 10 functions as the fertilizer carrying body for the vehicle 60 thereby eliminataing the necessity for a separate body. It is to be understood that other forms of the bin assembly 10, such as the forms in which the ground support legs are removed from the container 16 in the inoperative positions thereof as disclosed in the aforementioned copending application, are also usable in the system of this invention.

It will be understood that the bulk material handling system which is herein disclosed and described is presented for purposes of explanation and illustration and is not intended to indicate limits of the invention.

What is claimed is:

1. In a system for moving bulk fertilizer material from a storage area to a distributed position on a field,
   a bin assembly consisting of a hollow container having a downwardly extending hopper portion terminating in a discharge opening, downwardly extending support means on said container, and leg means on said container disposed a predetermined distance apart on opposite sides of said hopper portion, said leg means being movable between an operative position extending downwardly from said container a predetermined distance below said support means and an inoperative position,
   a transport vehicle having a load supporting bed of a width less than said predetermined spacing of said leg means enabling movement of said bed between said leg means, said bed being disposed at a height below the height of said support means when said leg means is ground supported, and lift means on said vehicle operable to raise and lower said bin assembly when said bed is located below said support means for disposing said support means on said bed in the inoperative position of said leg means, and
   a fertilizer distributor vehicle having a load supporting surface disposed at a height below the height of said support means means in the ground supported position of said leg means, said load supporting surface being of a width less than the spacing of said legs means enabling movement of said surface to a position below said support means, lift means on said distributor vehicle operable to raise and lower said bin assembly when said surface is located below said support means for disposing said support means on said surface in the inoperative position of said leg means, and fertilizer conveyor and distributor means on said vehicle located to receive fertilizer discharged from said container through said discharge opening in the supported position of said bin assembly on said surface,
   whereby a bin assembly containing fertilizer and disposed in one location is transportable on said transport vehicle to a second location, is transferrable at said second location to a supported position on said distributor vehicle, and is movable with said distributor vehicle to distribute the fertilizer therein.

2. The system according to claim 1 wherein said leg means is pivotally mounted on said container for movement between said operative and inoperative positions and in the inoperative position thereof extends upwardly on said container at a location above the lower end of said support means.

3. The system according to claim 1 further including lift force transmitting means on said bin assesmbly disposed above and in substantially vertical alignment with said transport vehicle lift means during raising and lowering of said bin assembly by said transport vehicle lift means and disposed above and in substantially vertical alignment with said distributor vehicle lift means during raising and lowering of said bin assembly by said distributor vehicle lift means.

4. The system according to claim 1 wherein said conveyor and distributor means includes a hollow body on said distributor vehicle having an inlet opening substantially vertically aligned with and disposed below said container discharge opening in a position of said bin assembly supported on said load supporting surface.

5. The method of moving bulk fertilizer material from a storage area to a distributed position on a field comprising the steps of:
   transferring the material at said storage area to portable bins of a sufficiently large size to preclude manual lifting,
   lifting said bins onto a transport vehicle at said storage area,
   transporting said bins from said area to said field,
   moving said bins from said vehicle to ground supported positions at said field, and
   moving said bins one at a time at said field onto a distributor vehicle for one-at-a-time travel therewith across said field to discharge the fertilizer therein and distribute said fertilizer onto said field.

References Cited

UNITED STATES PATENTS

| | | | |
|---|---|---|---|
| 2,020,628 | 11/1935 | Woodruff. | |
| 2,670,866 | 3/1954 | Glesby | 214—515 XR |
| 2,678,738 | 5/1954 | Mangrum | 214—515 XR |
| 3,250,437 | 5/1966 | Smith | 214—85.1 XR |

ALBERT J. MAKAY, Primary Examiner

U.S. Cl. X.R.

214—152, 515